(12) United States Patent
Sun (10) Patent No.: US 10,627,010 B2
(45) Date of Patent: Apr. 21, 2020

(54) METHOD AND APPARATUS FOR ISOLATING WATER VALVES

(71) Applicant: William Xiaoguang Sun, Stow, OH (US)

(72) Inventor: William Xiaoguang Sun, Stow, OH (US)

( * ) Notice: Subject to any disclaimer, the term of this patent is extended or adjusted under 35 U.S.C. 154(b) by 0 days.

(21) Appl. No.: 16/048,743

(22) Filed: Jul. 30, 2018

(65) Prior Publication Data

US 2020/0032923 A1    Jan. 30, 2020

(51) Int. Cl.
*F16K 43/00*    (2006.01)
*F16L 55/134*   (2006.01)
*F16L 55/18*    (2006.01)

(52) U.S. Cl.
CPC ............ *F16K 43/00* (2013.01); *F16L 55/134* (2013.01); *F16L 55/18* (2013.01); *Y10T 137/0486* (2015.04); *Y10T 137/0491* (2015.04); *Y10T 137/6109* (2015.04)

(58) Field of Classification Search
CPC ......... Y10T 137/0491; Y10T 137/0486; Y10T 137/0441; Y10T 137/6109; F16L 55/18; F16L 55/134; F16K 43/00
See application file for complete search history.

(56) References Cited

U.S. PATENT DOCUMENTS

| | | | | |
|---|---|---|---|---|
| 543,745 A | * | 7/1895 | Meyer | B65D 39/12 220/235 |
| 2,390,461 A | * | 12/1945 | Racz | F16L 55/132 138/89 |
| 2,690,612 A | * | 10/1954 | Scott | F16L 55/132 29/213.1 |
| 3,032,069 A | * | 5/1962 | Ficklin | F16L 55/124 138/89 |
| 5,592,965 A | * | 1/1997 | Rakieski | F16K 43/00 137/315.41 |
| 5,884,668 A | * | 3/1999 | Larkin | F16L 55/132 138/89 |
| 6,257,266 B1 | * | 7/2001 | Valdez | F16L 55/132 137/15.08 |
| 6,263,896 B1 | * | 7/2001 | Williams | F16K 7/10 137/15.15 |
| 6,581,620 B2 | * | 6/2003 | Babcock | F16L 55/134 137/15.15 |
| 9,115,814 B2 | * | 8/2015 | Sun | F16K 1/42 |
| 9,857,016 B2 | * | 1/2018 | Bourne | F16L 55/132 |

FOREIGN PATENT DOCUMENTS

JP    2016056905 A    *    4/2016

* cited by examiner

*Primary Examiner* — Mary E McManmon
*Assistant Examiner* — Kevin R Barss
(74) *Attorney, Agent, or Firm* — Renner, Kenner, Greive, Bobak, Taylor & Weber Co., L.P.A.

(57) ABSTRACT

A method for isolating a water valve for repair or replacement includes closing the valve and thereafter replacing an outlet pipe with an adapter pipe. An expandable plug is used to seal the adapter pipe, after which the valve is opened and an air tube having a bladder on an end thereof is inserted through the valve and expanded to seal the inlet pipe. Thereafter, the stem assembly of the valve or the entire valve itself may be removed for simple replacement of the sealing washer or total replacement of the valve. The apparatus for practicing the method, and including the expandable plug, inflatable bladder, and necessary tubing, plug actuator, and air valve are presented.

14 Claims, 11 Drawing Sheets

METHOD AND APPARATUS FOR ISOLATING WATER VALVES

FIELD OF THE INVENTION

The invention herein resides in the art of plumbing methods and apparatus. More particularly, the invention relates to a method and apparatus for isolating water valves requiring repair or replacement, and servicing that water valve without the necessity of shutting off any other valves in the plumbing system. More particularly, the invention relates to a method and apparatus for isolating water valves that provides for the implementation of temporary water blockages on opposite sides of a valve to isolate that valve to accommodate repair or replacement. More specifically, the invention relates to an apparatus and method whereby a tool can be made to pass through a valve and effect sequenced water stoppages inside of the pipes interconnected with the valve in order to accommodate removal of a valve stem and replacement of the sealing washer or, alternatively, the full removal and replacement of the entire valve itself.

BACKGROUND OF THE INVENTION

Large buildings maintaining factories, offices, or multiple residential dwellings often have a complex water system. In large facilities, such as schools, office buildings, manufacturing plants, apartment dwellings and the like, a main water system services the entire building through a series of pipes and valves. The repair or replacement of a valve typically requires that the valve be isolated from the water main and from the remainder of the water system to the greatest extent possible. While the designs for water systems for buildings often section the water system into discrete and separate areas such that only a single area need be shut down while effecting valve repairs and replacements, many buildings are designed so that the main water valve itself must be shut down in order to deactivate the entire system such that necessary repairs can be made. This, of course, is a great inconvenience in schools and apartment buildings, while it can also be extremely costly in manufacturing plants and the like.

There is a need in the plumbing art for a technique and apparatus that accommodates the singular isolation of valves so that repairs and replacements can be quickly and effectively made with a minimum of inconvenience and cost incurred.

DISCLOSURE OF INVENTION

In light of the foregoing, it is a first aspect of the invention to provide a method and apparatus for isolating water valves by which water flow on either side of a valve may be temporarily stopped while the valve is removed and replaced or serviced.

Another aspect of the invention is the provision of a method and apparatus for isolating water valves for service, which incorporate internal pipe plugs or bladders that can be used to sequentially block and seal the outlet and inlet pipes to a valve to accommodate the repair and/or replacement of the valve without encountering water flow.

A further aspect of the invention is the provision of a method and apparatus for isolating water valves for service in which the apparatus is reusable.

Yet another aspect of the invention is the provision of a method and apparatus for isolating water valves for replacement or repair in which the method and apparatus are simplistic and cost effective in design and implementation.

Still a further aspect of the invention is the provision of a method and apparatus for isolating water valves for repair or replacement, which rely upon and incorporate readily available structures and devices.

The foregoing and other aspects of the invention which will become apparent as the detailed description proceeds are achieved by a method for isolating and repairing or replacing a valve in a system of pipes, comprising closing a valve between an inlet and outlet pipe; removing said outlet pipe from said valve and replacing said outlet pipe with an adapter pipe; inserting an expandable plug into said adapter pipe and expanding said plug to seal against an inner circumferential surface of said adapter pipe; opening said valve; passing an inflatable seal through said expandable plug and said valve and into said inlet pipe; inflating said inflatable seal into sealing engagement with an inner circumferential surface of said inlet pipe; removing and replacing at least a portion of said valve; deflating said inflatable seal and retracting said inflatable seal from said inlet pipe, valve, and expandable plug; closing said valve; removing and replacing said adapter pipe with said outlet pipe; and opening said valve.

Further aspects of the invention which will become apparent herein are achieved by apparatus for isolating and repairing or replacing a valve in a system of pipes, comprising a first outer tube having first and second ends; a second sealing tube insert received within said first outer tube, said second sealing tube insert having a head at a first end thereof; an expandable plug interposed between said head and said first end of said first outer tube; and means engaging said second end of said second sealing tube for expanding said expandable plug.

BRIEF DESCRIPTION OF THE DRAWINGS

For an understanding of the various aspects of the structure and technique of the invention, reference should be made to the following detailed description and accompanying drawings wherein.

BEST MODE FOR CARRYING OUT THE INVENTION

Figure 1:
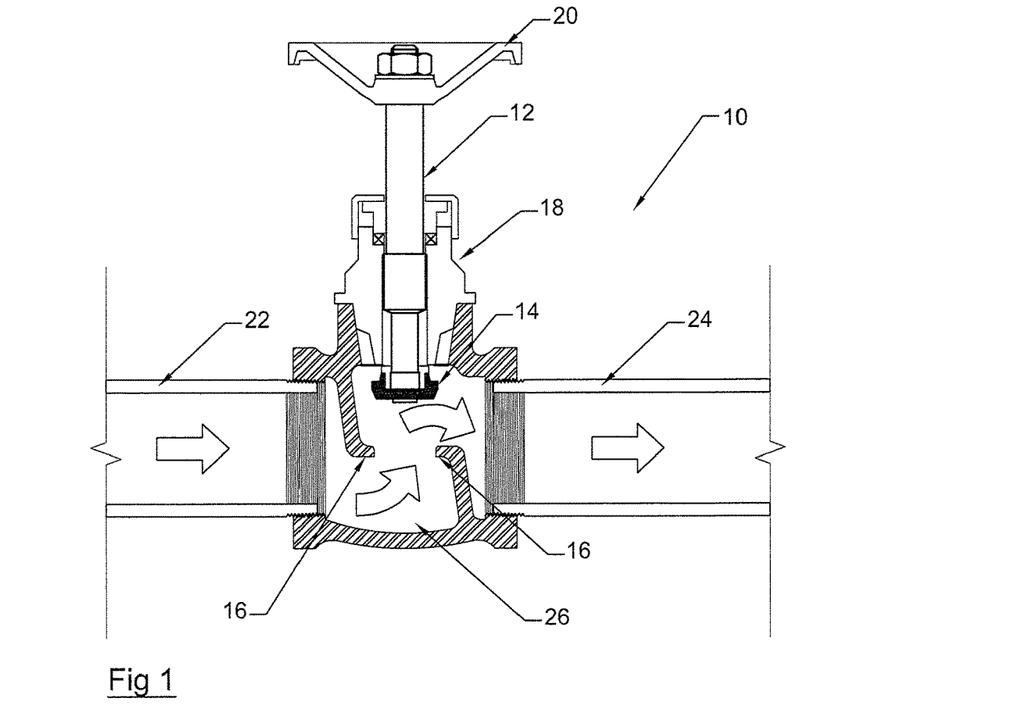
FIG. 1 is a sectional view of a water valve interposed between inlet and outlet pipes, with the valve open.

Referring now to the drawings and more particularly to FIG. 1, it can be seen that a common water pipe and valve system is designated generally by the numeral 10. A valve stem 12 is provided with a sealing washer 14 at an end thereof. As is well known in the art, the sealing washer 14 may be of rubber, plastic, or other suitable elastomer. Typically, it is disk-shaped, having beveled edges for seating with an annular valve seat 16, defining an aperture. A multiple-piece valve housing 18 receives the valve stem, sealing washer, and valve in separable fashion as will become apparent later herein. The valve stem 12 is typically rotated by a handle 20 to achieve engagement and disengagement of the sealing washer 14 with the seat 16. Suffice it to say that the valves at issue herein have an aperture that may be selectively opened and closed as by a sealing washer and valve seat, selective alignment of the aperture with inlet and outlet pipes, or otherwise.

An inlet pipe 22 is threadedly or otherwise sealingly connected to one side of the valve housing 18, while an outlet pipe 24 is similarly connected to the opposite side. A cavity 26 is provided within the lower portion of the valve housing 18. With the valve open such that the sealing washer 14 is separated from the valve seat 16, water passes from the inlet pipe 22, through the seat 16 maintained within the cavity 26, and out of the outlet pipe 24, as shown by the arrows in FIG. 1. Those skilled in the art will appreciate that engagement and disengagement of the sealing washer 14 with the valve seat 16 effects closing and opening of the valve to accommodate water flow.

Those skilled in the art readily appreciate that the sealing washer 14 is a wear part that often requires replacement in order to prevent the valve from "leaking" when it is closed. Less frequently, the entire valve assembly that is interposed between the inlet and outlet pipes 22, 24 needs to be replaced. The instant invention accommodates such replacement at the valve site without the requirement to close a main valve or other valves within the system. Disturbance of the system to effect such repairs takes place only at the valve site of interest.

Figure 2:
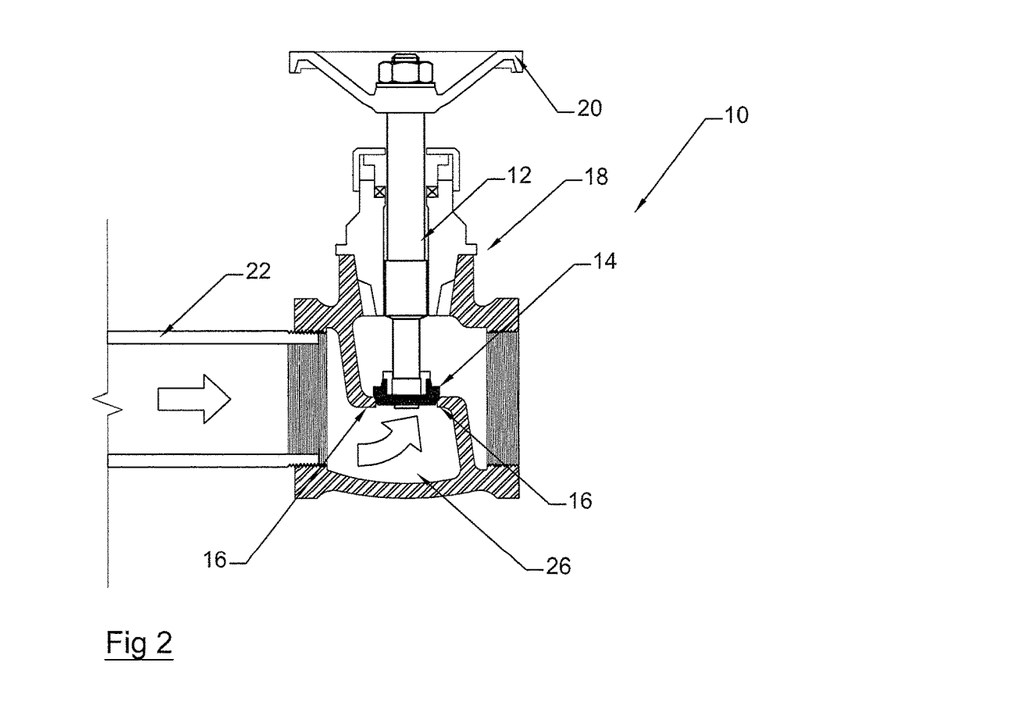
FIG. 2 is a cross-sectional view of the valve and inlet pipe of FIG. 1, with the valve closed and the outlet pipe removed.

With reference to FIG. 2, commencement of replacement of the sealing washer 14 or the entire valve assembly can be seen as beginning with the closing of the valve by engagement of the sealing washer 14 with the valve seat 16 and removal of the outlet pipe 24.

Figure 3:
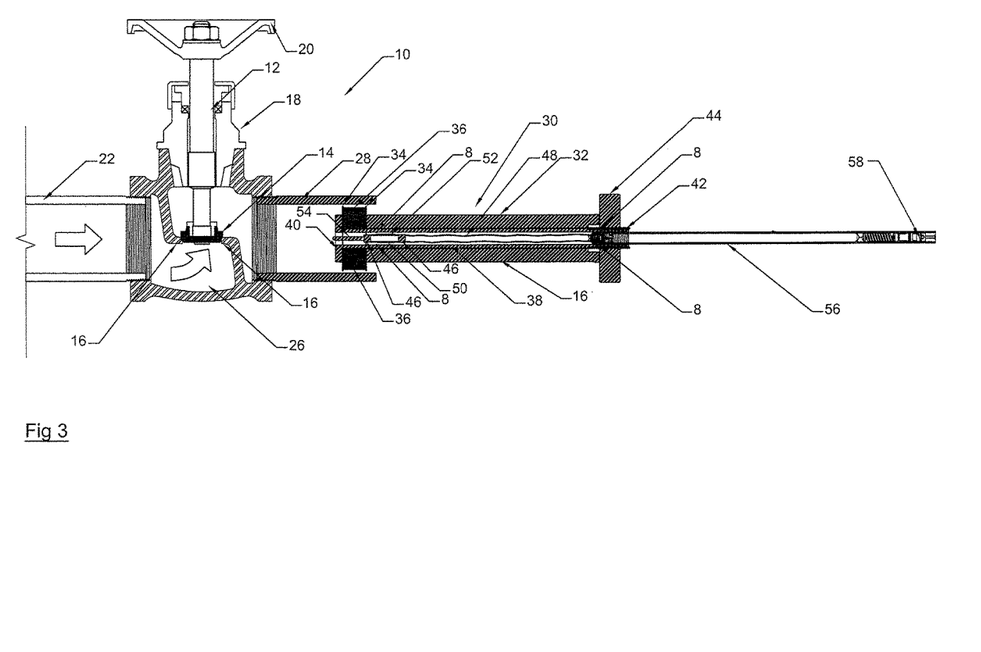
FIG. 3 is a cross-sectional view of the inlet pipe and valve of FIG. 2, with an adapter pipe replacing the outlet pipe and shown receiving the isolating mechanism of the invention.

As shown in FIG. 3, the outlet pipe 24 that was removed in FIG. 2 is replaced with an adapter pipe 28, which is preferably of a short length on the order of 1-4 inches. A seal tube assembly 30 is then employed to effect the isolation of the valve assembly for repair or replacement. The seal tube assembly comprises a tube 32, which is preferably of stainless steel. A pair of washers 34 sandwich an expandable plug 36 at an end of the tube 32, as shown. The expandable plug 36 is preferably of a rubber or elastomeric material. A sealing tube insert 38 is received internally of the tube 32 and has a disk-like head 40 formed on a first end thereof. The assembly of the expandable plug 36 sandwiched between the pair of washers 34 is maintained between the head 40 and an end of the tube 32, as shown. The washers 34 and plug 36 are of an annular nature, with the sealing tube insert passing therethrough.

As shown, a threaded second end 42 of the sealing tube insert 38 extends from a second end of the tube 32. A knob 44 is threaded onto the threaded end 42 to allow for the axial compression and resulting radial expansion of the expandable plug 36 to seal the inner circumference of the adapter pipe 28 as will be presented below.

With continued reference to FIG. 3, it can be seen that a flexible air tube 48 extends within the sealing tube insert 38 and is characterized by an air bladder 50 secured about an end 52 thereof. The end 52 of the flexible air tube 48 is preferably perforated to allow for inflation of the air bladder 50 encasing the perforated end 52. This encasement is achieved by appropriate ring clamps or collars 46. Extending from the most distal collar 46 is a stainless steel nose or pin 54. It will be appreciated that this nose or pin 54 assists in navigating through the valve, as will become apparent below.

Connected to the end of the flexible air tube 48, opposite its perforated end, is a substantially rigid stainless steel tube 56. This engagement is through an air valve or poppet valve 62, as will be discussed later herein. At the opposite end of the tube 56 is a second air valve or poppet valve 58, these poppet valves being spring biased as is readily understood by those skilled in the art.

Figure 4:
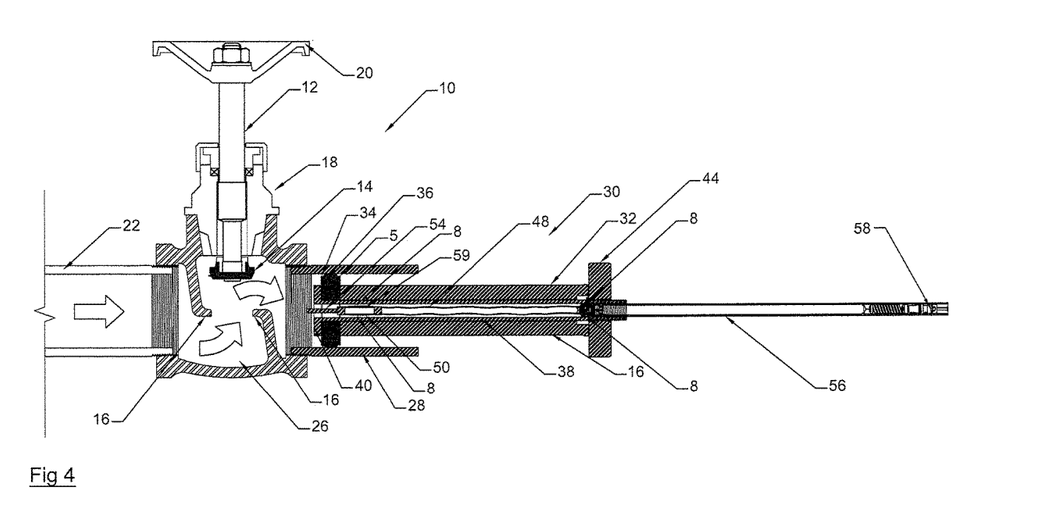
FIG. 4 shows the isolating mechanism inserted into the adapter pipe and sealed by an expandable plug.

With reference now to FIG. 4, it can be seen that the seal tube assembly 30 has been inserted into the adapter pipe 28 a substantial distance to be adjacent the valve assembly housing 18. At this point, the knob 44 is rotated, drawing the sealing tube insert 38 toward the knob such that the head 40 compresses the washers 34 and rubber to elastomeric plug 36 into compressive engagement with the end of the tube 32. The axial compressive engagement causes the plug 36 to expand radially into sealing engagement with the inner circumferential surface of the adapter pipe 28.

With the sealed tube assembly 30 in place and in actuated engagement with the interior of adapter pipe 28, the sealing washer 14 may be retracted from the valve seat 16 by rotation of the handle 20, allowing access into the cavity 26 and through the aperture of the valve seat 16 by the nose 54. This is achieved by pushing the substantially rigid pipe 56 through the sealing tube insert 38, pushing ahead of it the flexible air tube 48 with accompanying air bladder 50 and nose 54. It will be appreciated that the inner circumference of the sealing tube insert 38 may be provided with appropriate O-ring seals or the like (not shown) thereabout to engage the outer surface of substantially rigid tube 56 to preclude or eliminate any flow of water therethrough.

When O-ring seals are used, it is preferred that at least one seal is effected near each of the opposite ends of the sealing tube insert 38 to ensure that any water leakage is minimal. Of course, additional seals may be provided between the ends of the sealing tube insert 38. It will also be appreciated that the O-ring seals are received by circumferential grooves about the inner surface of the sealing tube insert 38 and engage the outer surfaces of the substantially rigid tube 56, and does so during travel of the tube 56 within the insert 38.

Figure 5:
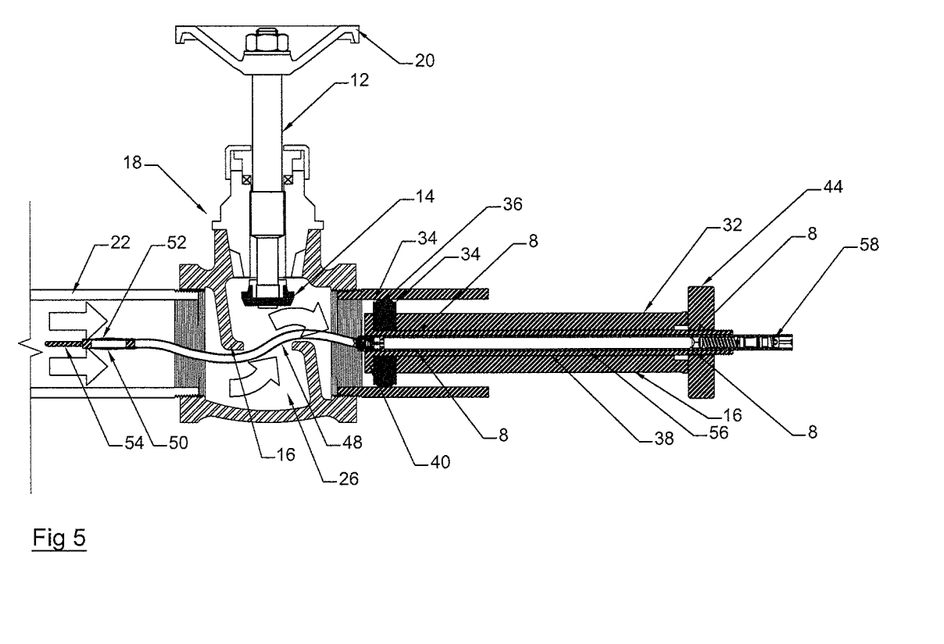
FIG. 5 shows the valve open and with a flexible air tube and bladder passing through an open valve seat and into the inlet pipe.

As shown in FIG. 5, the tube 56 has been substantially inserted through the tube 38, driving the flexible air tube 48, air bladder 50 encircling the perforated end 52, and nose 54 through the housing 18 of the valve and into the interior of the inlet pipe 22.

Figure 6:
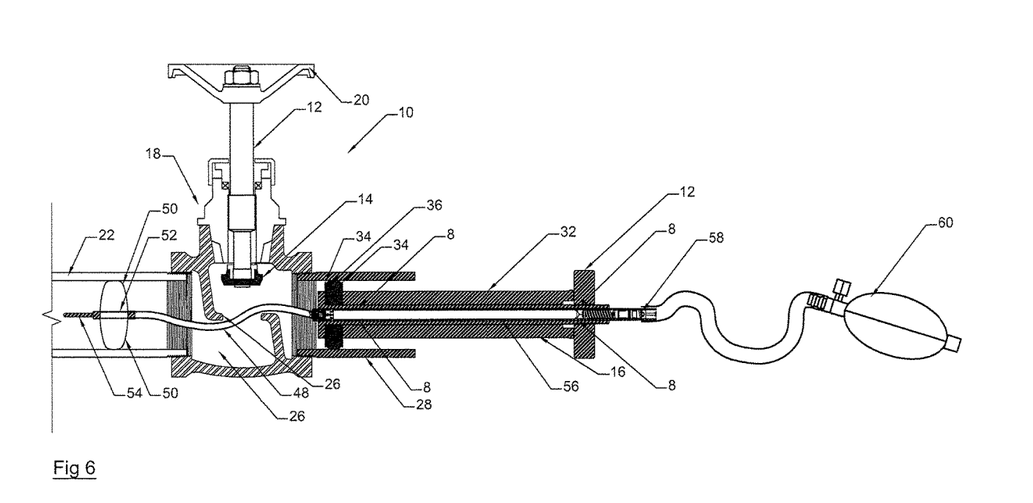
FIG. 6 shows the bladder expanded to seal the inlet pipe, thereby isolating the valve.

With reference now to FIG. 6, it can be seen that an air pump and hose assembly 60 may be connected to the air valve 58 at the end of tube 38 and the pump may be employed to inflate the air bladder 50 at the perforated end 52 of the flexible tube 48. Sufficient pressure is imparted to the membrane or air bladder 50 to engage the inner circumferential surface of the inlet pipe 22 to totally seal the same.

Figure 7:
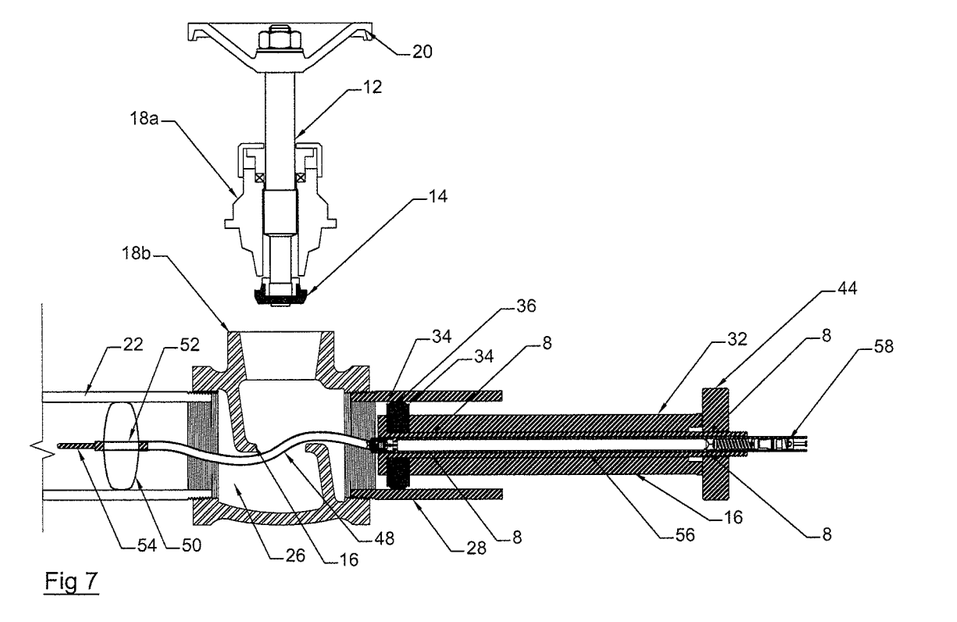
FIG. 7 shows removal of the valve stem assembly from the valve housing with the inlet pipe and outlet pipe sealed.

With reference to FIG. 7, it can be seen that with the air bladder 50 sealing the inlet pipe 22, the valve stem assembly 18a can be separated from the lower valve housing 18b such that access may be made to the sealing washer 14 for removal and replacement. Those skilled in the art will appreciate that such removal and replacement can be readily achieved by disengagement of a screw securing the sealing washer 14 to the stem 12. The hand pump and hose assembly 60 may then also be removed.

Figure 8:
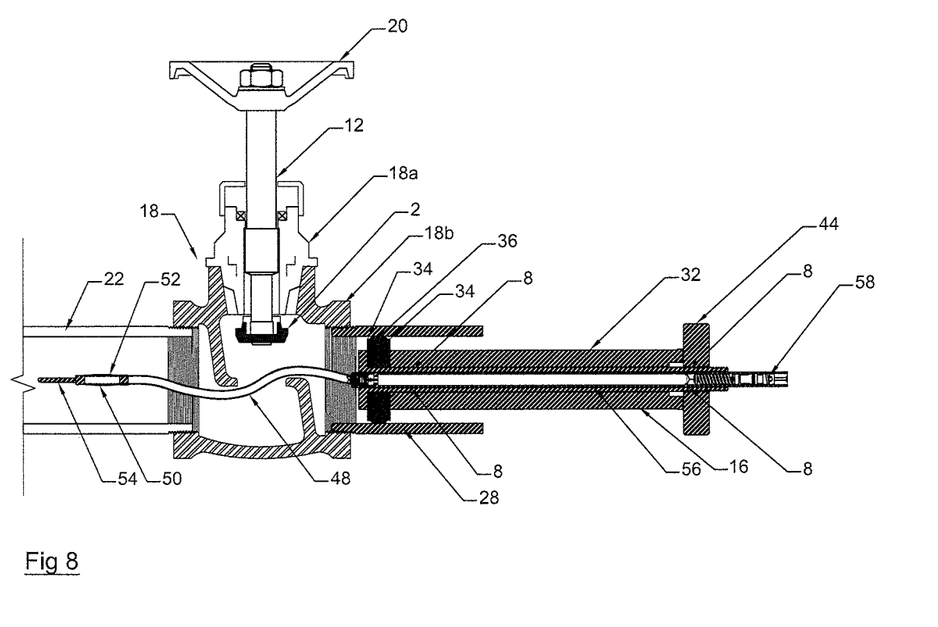
FIG. 8 is a cross-sectional view showing the valve stem assembly with a new sealing washer reinserted into the valve housing.

As shown in FIG. 8, the multiple-piece valve housing 18 may then be reassembled and the air bladder 50 exhausted, with the only sealing engagement then being between the expandable plug 36 and the inner circumference of the adapter pipe 28.

With continued reference to FIG. 8, it can be appreciated that the substantially rigid tube 56 may then be withdrawn from the sealing tube insert 38, causing the withdrawal of the flexible air tube 48 and associated assembly 50-54 through the open valve seat 16 and into receipt by the interior of the sealing tube 38. At this time, the valve may be closed by rotating the handle 20 to seat the sealing washer 14 against the valve seat 16, preventing any flow of water into the adapter pipe 28. The adapter pipe 28 may then be removed from the valve and the remainder of the outlet plumbing, such as outlet pipe 24, be attached in standard fashion. Accordingly, the valve assembly has been repaired. It will also be appreciated that other repairs could be effected, such as replacement of washers, packings, the valve stem, or the like.

The concept of the invention is applicable to full replacement of the valve assembly, as well as simple removal of the valve stem assembly 18a for purposes of washer repair, washer replacement, and the like. The process is akin to that just described, but with modifications to accommodate full removal of the valve assembly. With attention to FIG. 9, it can be seen that the air bladder 52 has been inflated within the inlet pipe 22 as in FIG. 7. However, in FIG. 9, the expandable plug 36 has been relaxed by reversing the turning of the handle 44, thus relieving the clamping action between the head 40 and the tube 32.

Figure 10:
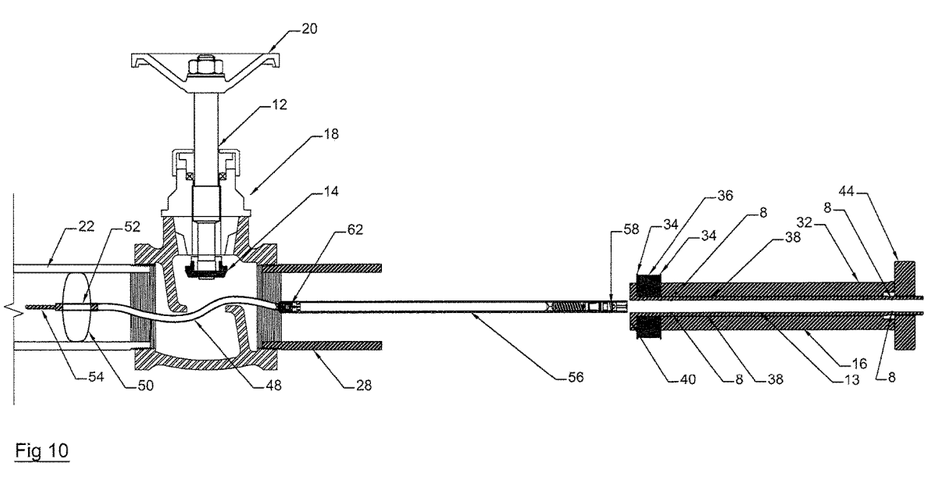
FIG. 10 shows the removal of the blocking mechanism from the outlet pipe, with the inlet pipe still plugged.

Next, in FIG. 10, it can be seen that the tube 32 containing the sealing tube insert 38 is totally retracted from the adapter pipe 28, leaving the substantially rigid tube 56 in interconnection with the flexible air tube 48. The poppet valves 58, 62 remain closed, keeping the air bladder 50 inflated and in interior sealing engagement with the inlet pipe 22.

Figure 11:
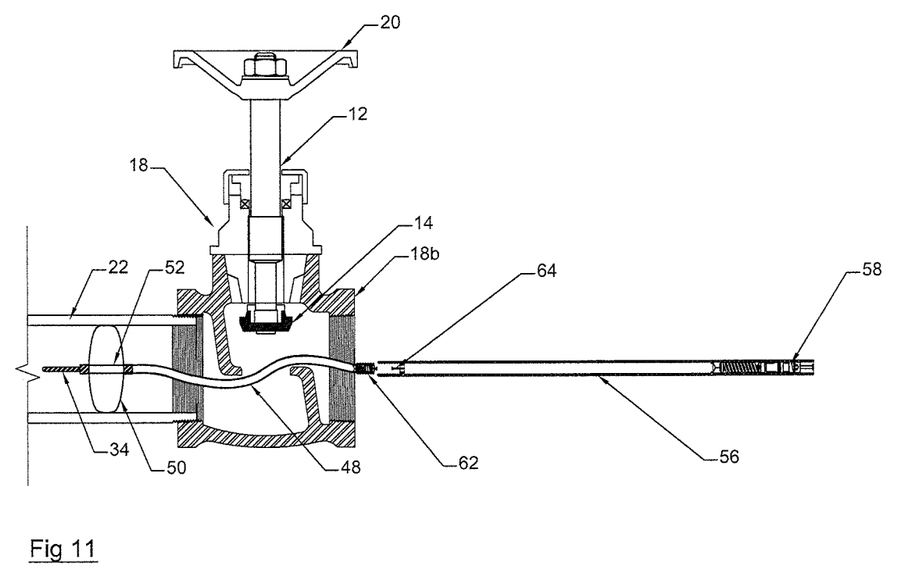
FIG. 11 shows separation of the bladder inflation mechanism employed for sealing the inlet pipe to accommodate removal of the entire valve assembly.

At FIG. 11, the poppet air valve 62 is threadedly disengaged from the tube 56, with its spring-biased nature urging it into a closed position upon disengagement from an actuator pin 64 secured internally of the tube 56, such that the bladder 50 remains inflated and the tube 56 can be removed.

Figure 9:
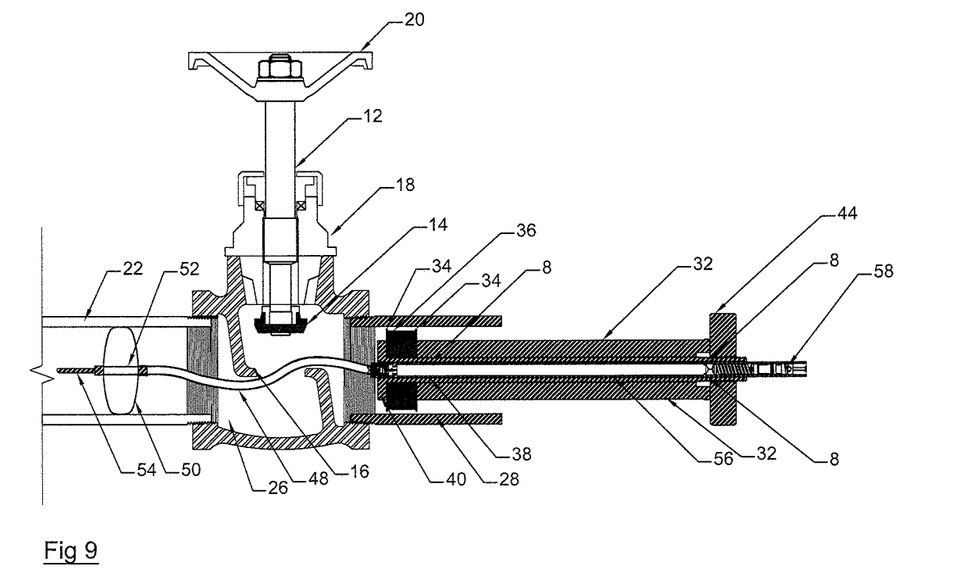
FIG. 9 illustrates commencement of the process of removal of the entire valve assembly by disengaging the plug from the outlet pipe.
Figure 12:
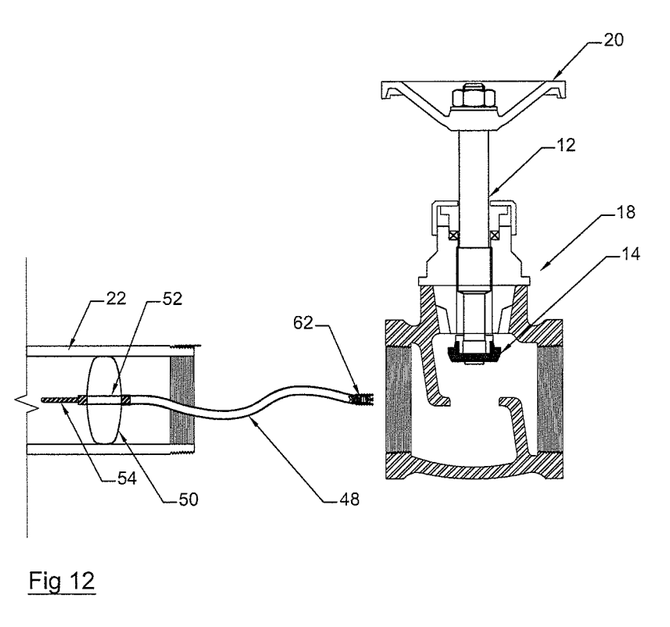
FIG. 12 shows the valve assembly being removed from the inlet pipe for full replacement.

Finally, as shown in FIG. 12, the multiple-piece valve housing 18 can be unthreaded/removed from the inlet pipe 22, as shown. An entirely new valve assembly can then be reattached to the inlet pipe 22. The poppet valve 62 can then be reconnected as shown in FIG. 11, such that the substantially rigid tube 56 is then available for insertion into the coupled tube assembly 32, 38 as shown in FIGS. 10 and 9. The handle 44 may then be rotated to radially expand the expandable plug 36 into interior sealing engagement with the circumferential wall of the outlet pipe 24, as best shown in FIG. 8, subsequently allowing for deflation of the air bladder 50 and removal of tube 56, flexible air tube 48, and associated appendages 50, 52, 54 to the point as shown in FIG. 4. The valve may then be closed by turning the handle 20 and seating the sealing washer 14 upon the valve seat 16, after which the expandable plug 36 may be released, and the seal tube assembly 30 removed from the adapter pipe 28. Subsequently, the adapter pipe 28 may be removed and the outlet pipe 24 be replaced, bringing the piping system to its original condition with a new valve assembly in place.

Thus it can be seen that the various aspects of the invention have been satisfied by the structure and techniques presented and described above. While in accordance with the patent statutes only the best known and preferred embodiments of the invention have been presented and described in detail, the invention is not limited thereto or thereby. Accordingly, for an appreciation of the scope and breadth of the invention, reference should be made to the following claims.

What is claimed is:

1. A method for isolating and repairing or replacing a valve in a system of pipes, comprising:
   closing a valve between an inlet and outlet pipe;
   removing said outlet pipe from said valve and replacing said outlet pipe with an adapter pipe;
   inserting an expandable plug into said adapter pipe and expanding said plug to seal against an inner circumferential surface of said adapter pipe;
   opening said valve;
   passing an inflatable seal through said expandable plug and said valve and into said inlet pipe;
   inflating said inflatable seal into sealing engagement with an inner circumferential surface of said inlet pipe;
   removing and replacing at least a portion of said valve;
   deflating said inflatable seal and retracting said inflatable seal from said inlet pipe, valve, and expandable plug;
   closing said valve;
   removing and replacing said adapter pipe with said outlet pipe; and
   opening said valve.

2. The method according to claim 1, wherein said valve has an aperture, the opening and closing of said valve being effected by opening and closing of said aperture.

3. The method according to claim 2, wherein said steps of passing through and retracting from said valve are effected through said aperture.

4. The method according to claim 3, wherein said step of removing and replacing at least a portion of said valve comprises removing a valve stem assembly from said valve, removing and replacing a sealing washer, and replacing said valve stem assembly.

5. The method according to claim 3, wherein said step of removing and replacing at least a portion of said valve comprises removing and replacing the valve itself.

6. The method according to claim 5, wherein said step of removing and replacing at least a portion of said valve comprises removing said expandable valve from said adapter pipe, separating said plug from said inlet pipe and adapter pipe, interconnecting a new valve with said inlet pipe and adapter, and replacing said expandable plug within said adapter pipe and expanding said plug to seal against an inner circumferential surface thereof.

7. Apparatus for isolating and repairing or replacing a valve in a system of pipes, comprising:
   a first outer tube having first and second ends;
   a second sealing tube insert received within said first outer tube, said second sealing tube insert having a head at a first end thereof;

an expandable plug interposed between said head and said first end of said first outer tube;

means engaging said second end of said second sealing tube for expanding said expandable plug; and a flexible air tube adapted for receipt by said second sealing tube insert, said flexible air tube having an inflatable bladder at a first end thereof.

8. The apparatus according to claim 7, wherein said means for expanding said expandable plug compresses said plug axially to expand said plug radially.

9. The apparatus according to claim 8, wherein said means for expanding said expandable plug compresses said expandable plug between said head and said first end of said first outer tube.

10. The apparatus according to claim 9, wherein said means for expanding said expandable plug comprises a knob threadedly received on a second end of said second sealing tube insert.

11. The apparatus according to claim 7, further comprising an elongated nose extending from said air bladder.

12. The apparatus according to claim 7, further comprising a substantially rigid tube operatively connected to said flexible air tube at a second end thereof.

13. The apparatus according to claim 12, wherein said substantially rigid tube is slidably receivable within said second sealing tube.

14. The apparatus according to claim 13, wherein said substantially rigid tube has an air valve at an end thereof for engagement with an air pump.

\* \* \* \* \*